US008544728B2

(12) United States Patent
Uesaka et al.

(10) Patent No.: US 8,544,728 B2
(45) Date of Patent: Oct. 1, 2013

(54) MONEY HANDLING APPARATUS AND MONEY HANDLING METHOD

(75) Inventors: Sadaaki Uesaka, Hyogo-Ken (JP); Teruo Sudo, Chiba (JP); Keishi Kobayashi, Hyogo-Ken (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 178 days.

(21) Appl. No.: 12/803,919

(22) Filed: Jul. 9, 2010

(65) Prior Publication Data

US 2011/0054666 A1 Mar. 3, 2011

(30) Foreign Application Priority Data

Jul. 13, 2009 (JP) ................................ 2009-164451

(51) Int. Cl.
*G06K 7/00* (2006.01)

(52) U.S. Cl.
USPC ............................ 235/379; 235/375; 235/380

(58) Field of Classification Search
USPC ................................. 235/375, 379, 380, 383
See application file for complete search history.

(56) References Cited

U.S. PATENT DOCUMENTS

2002/0054120 A1* 5/2002 Kawano et al. ............... 345/773
2007/0250934 A1* 10/2007 Park ................................ 726/26
2008/0172735 A1* 7/2008 Gao et al. ........................ 726/19
2011/0089230 A1* 4/2011 Artino et al. .................. 235/379
2011/0181522 A1* 7/2011 Rendahl ........................ 345/173

* cited by examiner

*Primary Examiner* — Michael G Lee
*Assistant Examiner* — Matthew Mikels
(74) *Attorney, Agent, or Firm* — Renner, Kenner, Greive, Bobak, Taylor & Weber

(57) ABSTRACT

A money handling apparatus includes an operation/display unit to display a money count result, and to display a portion or all of a plurality of various operation keys. The display of operation keys is based on the existence or nonexistence of display, contents of display, display-position information, and one or more conditions of display. A setting unit is configured to set the existence or nonexistence of the display for each operation key, while a control unit calculates the display-position information for each operation key, based on one or more conditions of display stored in the memory unit. The control unit also controls the operation/display unit to display the money count result and to display each operation key that is set to be displayed, in the display position and size that is based on the display-position information for the operation key.

12 Claims, 11 Drawing Sheets

| EXISTENCE OR NONEXISTENCE OF DISPLAY | OPERATION KEY | FREQUENCY IN USE | DISPLAY POSITION | SIZE | SHAPE | COLOR | EVALUATION VALUE |
|---|---|---|---|---|---|---|---|
| ○ | START/STOP KEY | 5 | CENTRAL AND RIGHT POSITION | LARGE | RECTANGLE | RED | 19 |
| ○ | ACCEPT KEY | 5 | RIGHT LOWER POSITION | MEDIUM | RECTANGLE | YELLOW | 11 |
| × | CLEAR KEY | 3 | RIGHT LOWER POSITION | SMALL | RECTANGLE | YELLOW | 7 |
| ○ | ARROW KEYS | 5 | CENTRAL POSITION | LARGE | TRIANGLE | BLUE | 21 |
| | | | | | | | |
| × | MODE KEY | 1 | LEFT LOWER POSITION | SMALL | RECTANGLE | YELLOW | 5 |

FIG. 10

| OPERATION KEY | TYPE A | TYPE B | TYPE C | TYPE D | TYPE E |
|---|---|---|---|---|---|
| START/STOP KEY | ○ | ○ | ○ | ○ | ○ |
| ACCEPT KEY | ○ | ○ | ○ | ○ | ○ |
| CLEAR KEY | ○ | ○ | ○ | ○ | ○ |
| ARROW KEYS | ○ | × | ○ | × | × |
| NUMERIC KEYS | ○ | ○ | × | ○ | × |
| SHIFT KEY | ○ | ○ | × | × | × |
| ⋮ | ⋮ | ⋮ | ⋮ | ⋮ | ⋮ |
| MODE KEY | ○ | ○ | ○ | × | × |

FIG. 13

MONEY HANDLING APPARATUS AND MONEY HANDLING METHOD

FIELD OF THE INVENTION

The present invention relates to a money handling apparatus including an operation/display unit, such as a touch panel or the like and a money handling method, and particularly relates to the money handling apparatus and money handling method, respectively capable of enhancing the operability of the operation/display unit.

BACKGROUND OF THE INVENTION

The money handling apparatus, which is used for handling money and includes the touch panel provided to an outer surface of its casing, has been known. In general, this touch panel is adapted for displaying thereon a count result on the money as well as displaying thereon various operation keys, such as a start key, a stop key, an accept key, a clear key, numeric keys and the like. With this touch panel, when a user pushes a certain operation key, among the various operation keys respectively displayed on the touch panel, an instruction corresponding to this operation key is sent to a control unit of the money handling apparatus. As the money handling apparatus of this type, for instance, an apparatus as disclosed in US005912982A or the like has been known. Further, JP2005-354143A discloses a remote controller used for a household electrical appliance and provided with the touch panel adapted for displaying the various operation keys thereon.

DISCLOSURE OF THE INVENTION

As the touch panel provided to the remote controller or the like, a device, which is configured to display thereon all of the various operation keys in an initial state thereof, while allowing an operator to optionally set each operation key to be displayed or not to be displayed on the touch panel, has been known. In the touch panel of this type, the display position and size of each operation key are respectively set, in advance, and thus each operation key is displayed in such preset position and size. Further, once the operator sets existence or nonexistence of display for each operation key, only the operation key or keys set to be displayed, among the various operation keys, will be displayed on the touch panel, while the other operation key or keys set not to be displayed will not be displayed on the touch panel. In this case, since the display position and size of each operation key are respectively set in advance, each region corresponding to the operation key or keys set not to be displayed will become merely a blank region (i.e., a region in which nothing is displayed).

However, in such a touch panel as described above, as the number of the operation keys is considerably large, the size of each operation key should be decreased, in reverse proportion to the number of such operation keys. Therefore, when the operation key displayed on the touch panel is pushed, the operator may tend to inadvertently push two operation keys, at a time, or otherwise may tend to accidentally push another operation key located adjacent to a target operation key. In addition, in the case only the operation key or keys set to be displayed, among the various operation keys, are displayed on the touch panel, if such operation key or keys are located at or around peripheral or corner portions of the touch panel, it is likely to be difficult for the operator to accurately push each of such operation keys.

The present invention was made in light of the above problem, and therefore it is an object of this invention to provide a money handling apparatus and money handling method, respectively capable of enhancing the operability of the operation/display unit. Namely, according to the money handling apparatus and money handling method of this invention, once the operator sets existence or nonexistence of display, for each operation key to be displayed on the operation/display unit, such as the touch panel or the like, only the operation key or keys set to be displayed, among the various operation keys, can be displayed on the operation/display unit, while each display position and size of such displayed operation key or keys can be changed so as to facilitate each operation of such operation key or keys performed by the operator, thereby significantly enhancing the operability of the operation/display unit.

The money handling apparatus of this invention includes: a memory unit configured to store therein existence or nonexistence of display, contents of display, display-position information and one or more conditions of display, for various operation keys, respectively; an operation/display unit configured to display thereon a count result on money as well as configured to display thereon a part or all of the various operation keys, based on the existence or nonexistence of display, contents of display, display-position information and one or more conditions of display, for the various operation keys, respectively stored in the memory unit; a setting unit configured to set the existence or nonexistence of display for each operation key; and a control unit configured to calculate the display-position information on each operation key, based on one or more conditions of display stored in the memory unit, for only the operation key or keys, among the various operation keys, respectively set, by the setting unit, to be displayed on the operation/display unit, as well as configured to make the operation/display unit display thereon the count result on the money as well as display thereon each operation key set to be displayed, in the display position and size based on the display-position information on each operation key, and when a certain operation key displayed on the operation/display unit is pushed, an instruction corresponding to this operation key is sent to the control unit.

According to this money handling apparatus, the operation/display unit can serve to display thereon the count result on the money as well as display thereon a part or all of the various operation keys, based on the existence or nonexistence of display, contents of display, display-position information and one or more conditions of display, for the various operation keys, respectively stored in the memory unit. Further, the existence or nonexistence of display for the various operation keys can be set by the setting unit and the display-position information on each operation key can be calculated, based on one or more conditions of display stored in the memory unit, for only the operation key or keys, among the various operation keys, respectively set, by the setting unit, to be displayed on the operation/display unit. In addition, the operation/display unit is controlled to display thereon the count result on the money as well as to display thereon each operation key set to be displayed, in the display position and size based on the display-position information on each operation key. Therefore, once the operator sets the existence or nonexistence of display, for each operation key to be displayed on the operation/display unit, only the operation key or keys set to be displayed, among the various operation keys, can be displayed on the operation/display unit, while the display position and size of each displayed operation key can be changed so as to facilitate the operation of each key performed by the operator, thereby significantly enhancing the operability of the operation/display unit.

In the money handling apparatus according to the present invention, the control unit may be configured to change the position and/or size of a region, in which the count result on the money is displayed on the operation/display unit, based on the number of the operation keys, among the various operation keys, respectively set, by the setting unit, to be displayed on the operation/display unit.

In the money handling apparatus according to the present invention, the control unit may be configured to calculate the display-position information on each operation key, such that a region, in which a part or all of each operation key are respectively displayed on the operation/display unit, is enlarged, with decrease of the number of the operation keys, among the various operation keys, respectively set, by the setting unit, to be displayed on the operation/display unit.

In the money handling apparatus according to the present invention, one or more conditions of display of each operation key may include at least one of frequency in use, display position, size, shape and color, of the operation key.

In the money handling apparatus according to the present invention, the setting unit may be configured to set the existence or nonexistence of display for each operation key, as well as configured to set one or more conditions of display of each operation key.

In the money handling apparatus according to the present invention, the control unit may calculate the display-position information, based on a degree of importance for each operation key calculated under one or more conditions of display of each operation key stored in the memory unit.

Alternatively, the control unit may calculate the display-position information, based on an order of priority of each operation key calculated under one or more conditions of display of each operation key stored in the memory unit.

Alternatively, the memory unit may store therein a plurality of arrangement patterns, in advance, corresponding to the number of the operation keys set to be displayed on the operation/display unit, and the control unit may calculate the display-position information on each operation key, based on the arrangement pattern stored in the memory unit, corresponding to the number of the operation keys, as well as based on one or more conditions of display stored in the memory unit, for only the operation key or keys, among the various operation keys, respectively set, by the setting unit, to be displayed on the operation/display unit.

In the money handling apparatus according to the present invention, the same operation/display unit may be commonly used for a plurality of money handling apparatuses of different types, the memory unit may store therein information, for each operation key, on whether or not this operation key is to be used in each of the plurality of money handling apparatuses of the different types, and the control unit may calculate the display-position information on each operation key, based on one or more conditions of display stored in the memory unit, for only the operation key or keys, among the various operation keys, respectively stored, in the memory unit, to be used corresponding to the type of each money handling apparatus, as well as set, by the setting unit, to be displayed on the operation/display unit.

In the money handling apparatus according to the present invention, the contents of display of each operation key may be an icon, and the display-position information on each operation key may be a coordinate of each of start and end points of each corresponding icon displayed on the operation/display unit.

In the money handling apparatus according to the present invention, the operation/display unit may be composed of a touch panel.

The money handling method of this invention uses the money handling apparatus as described above and includes: storing the existence or nonexistence of display, contents of display, display-position information and one or more conditions of display, for the various operation keys, in advance, respectively in the memory unit; changing the existence or nonexistence of display of each operation key, for the operation key or keys to be displayed on the operation/display unit; calculating the display-position information on each operation key, based on one or more conditions of display stored in the memory unit, for only the operation key or keys set to be displayed, among the various operation keys; and displaying the count result on the money counted by the money handling apparatus, on the operation/display unit, as well as displaying each operation key set to be displayed, on the operation/display unit, in the display position and size based on the display-position information on each operation key, and when a certain operation key displayed on the operation/display unit is pushed, the instruction corresponding to this operation key is sent to the control unit of the money handling apparatus.

According to this money handling method, once the operator sets the existence or nonexistence of display, for each operation key to be displayed on the operation/display unit, only the operation key or keys set to be displayed, among the various operation keys, can be displayed on the operation/display unit, while the display position and size of each operation key can be changed so as to facilitate the operation of each key performed by the operator, thereby significantly enhancing the operability of the operation/display unit.

BRIEF DESCRIPTION OF THE DRAWINGS

FIG. 3 is a flow chart showing an operation for changing a display layout of the various operation keys on the operation/display unit of the banknote handling apparatus shown in FIG. 1 or the like.

FIG. 4 is a diagram showing the contents of display on the operation/display unit of the banknote handling apparatus shown in FIG. 1 or the like.

FIG. 10 is a table for illustrating the conditions of display and the existence or nonexistence of display, for the various operation keys.

FIG. 13 is a table showing each operation key to be used or not to be used for each banknote handling apparatus, when a plurality of banknote handling apparatuses of various types are utilized.

DETAILED DESCRIPTION OF THE INVENTION

Figure 1:
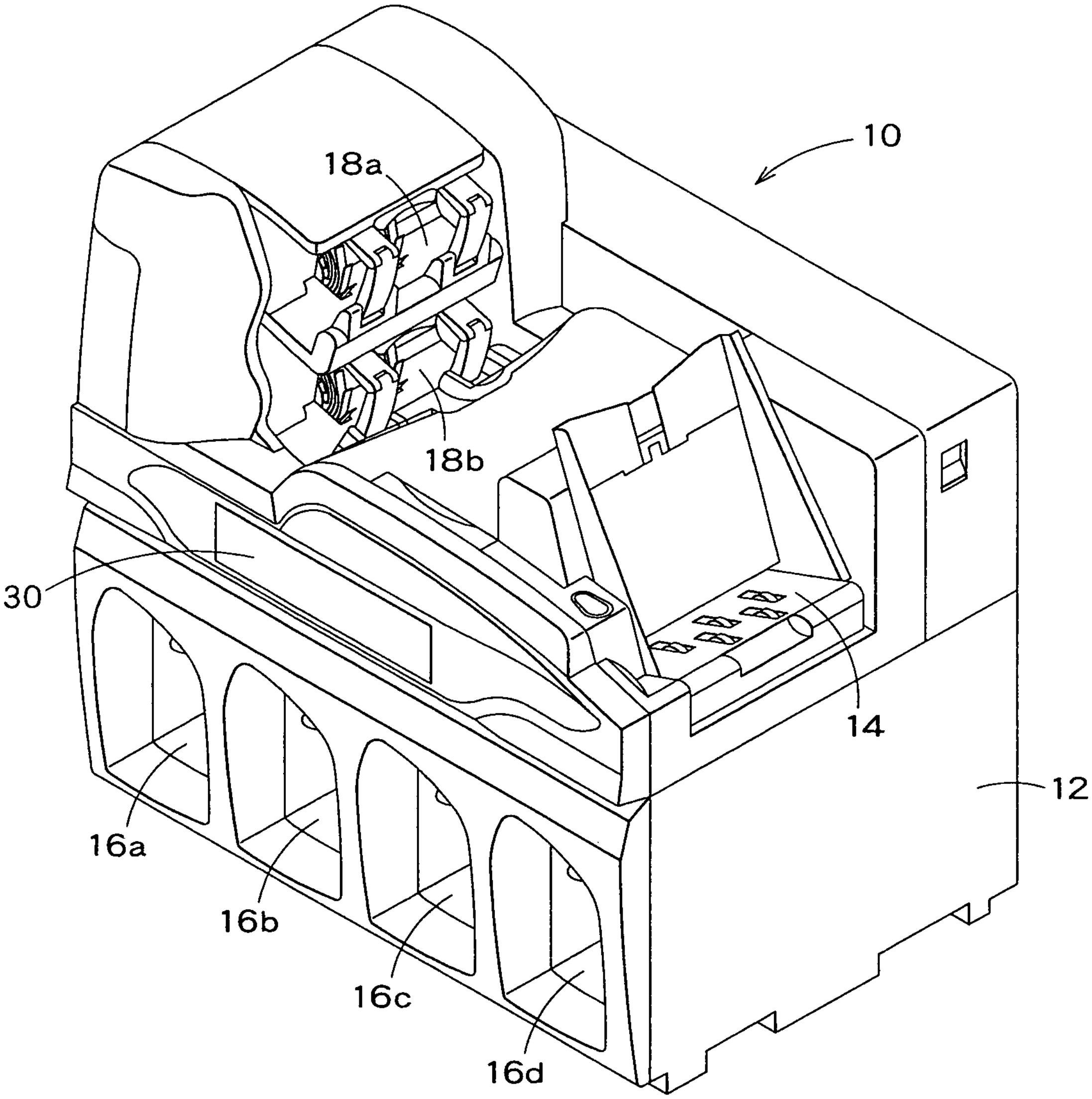
FIG. 1 is a perspective view showing a construction of a banknote handling apparatus related to one embodiment of the present invention.
Figure 2:
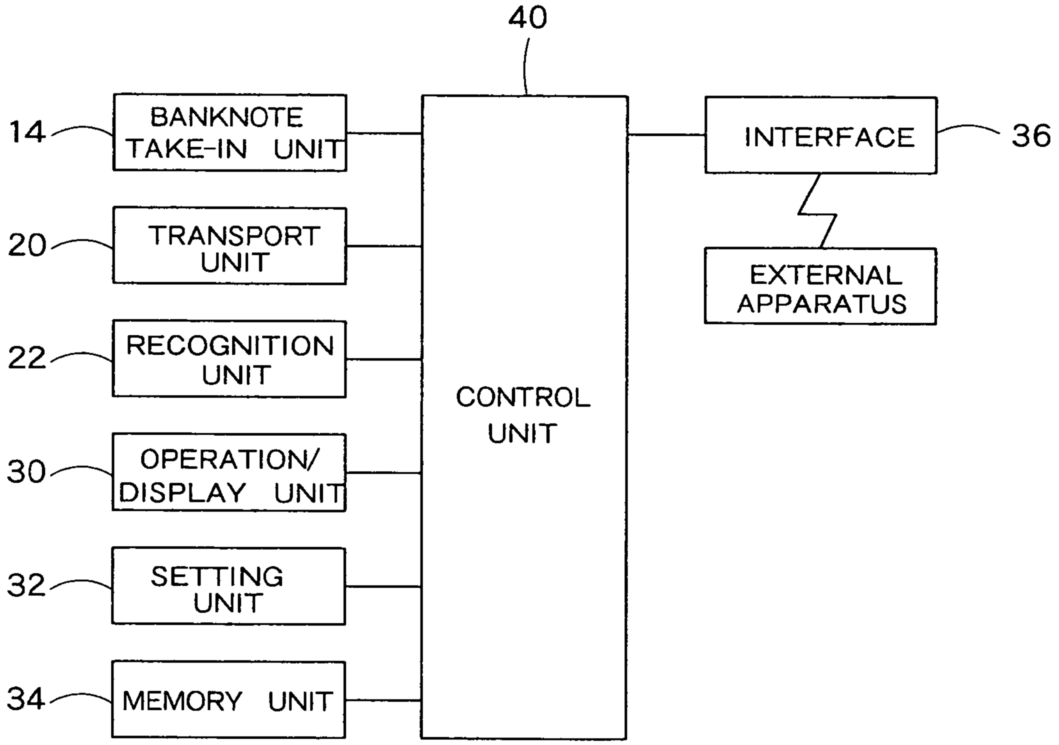
FIG. 2 is a block diagram illustrating a control system of the banknote handling apparatus shown in FIG. 1.
Figure 3:
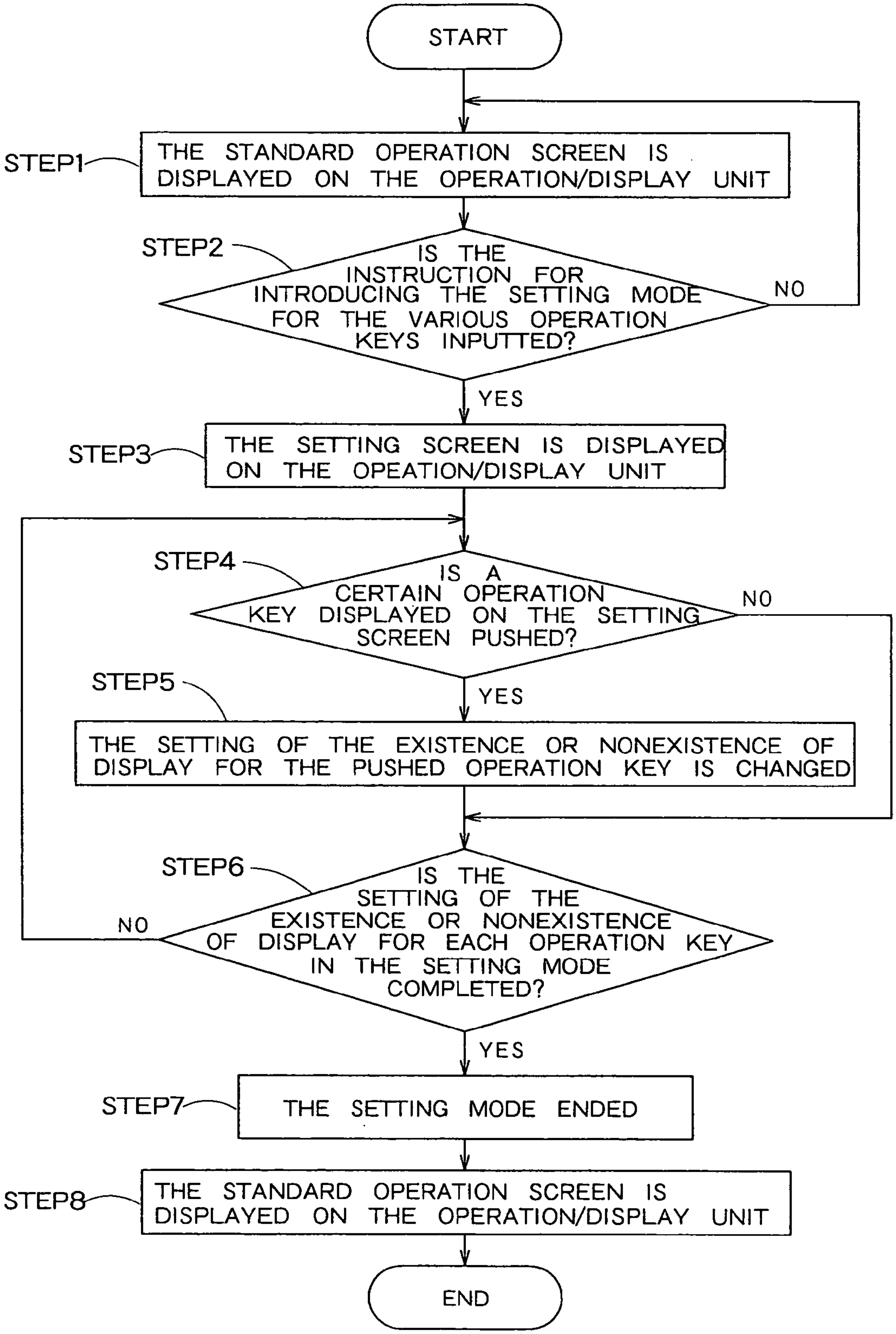
Figure 11:
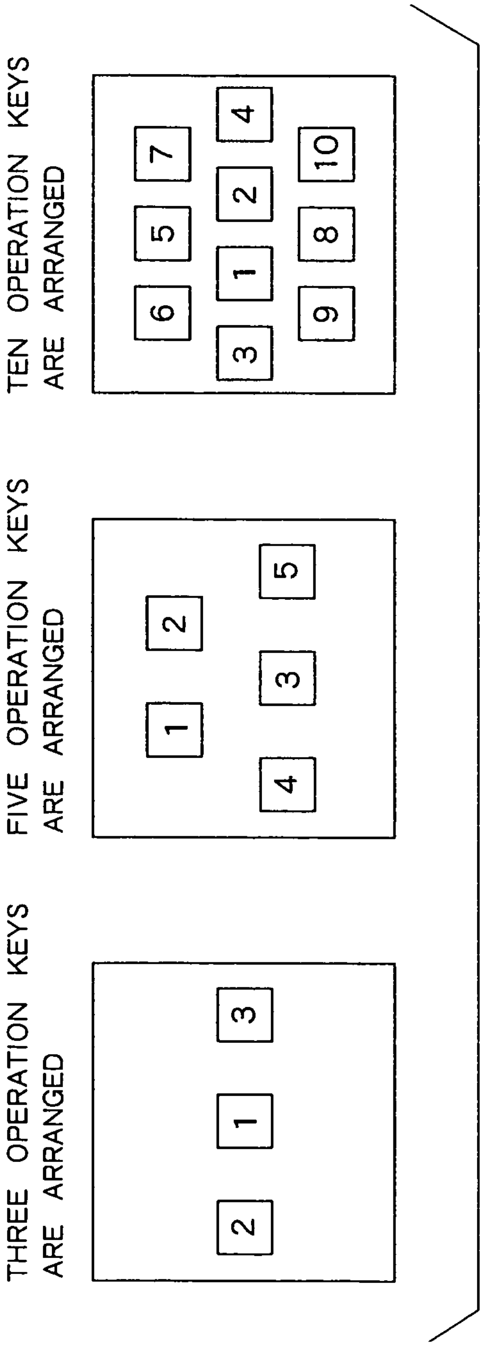
FIG. 11 is a diagram illustrating arrangement patterns of the operation keys respectively displayed on the operation/display unit, in which each arrangement pattern is shown, corresponding to the number of the operation keys.
Figure 12:
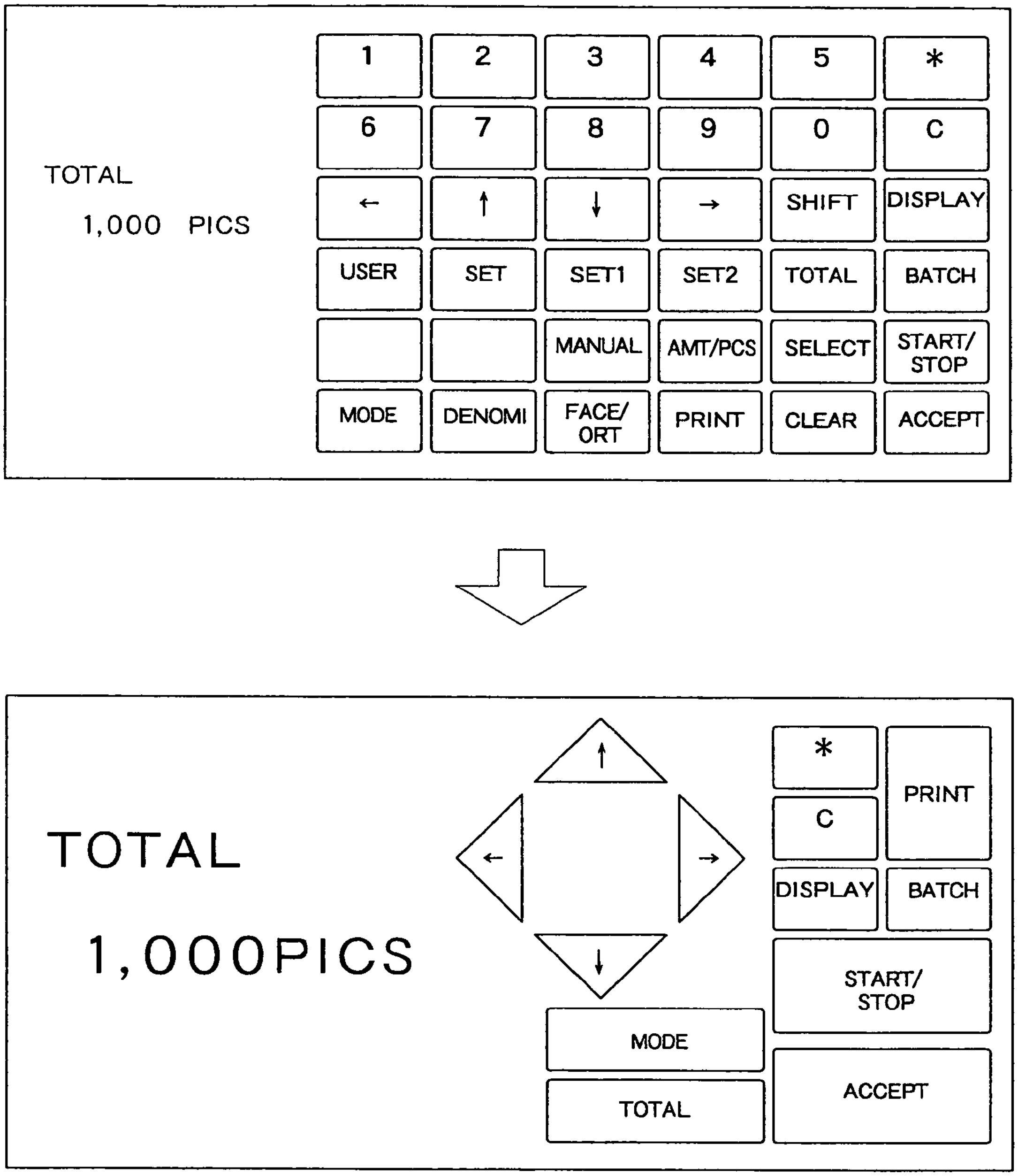
FIG. 12 is a diagram showing the contents of display on the operation/display unit, when the position and/or size of a region for displaying the count result on the banknotes is changed on the display/operation unit.

Hereinafter, one embodiment of the present invention will be described with reference to the drawings. FIGS. 1 through 12 are provided herein for respectively illustrating the banknote handling apparatus related to this embodiment. Of these drawings, FIG. 1 is the perspective view showing the construction of the banknote handling apparatus related to this embodiment, and FIG. 2 is the block diagram illustrating the control system of the banknote handling apparatus shown in FIG. 1. FIG. 3 is the flow chart showing the operation for changing the display layout of the various operation keys on the operation/display unit of the banknote handling apparatus shown in FIG. 1 or the like. FIGS. 4 through 9 are provided for respectively illustrating the contents of display on the operation/display unit of the banknote handling apparatus shown in FIG. 1 or the like. FIG. 10 is the table for illustrating the conditions of display and existence or nonexistence of display, for the various operation keys, and FIG. 11 is the diagram illustrating the arrangement patterns of the operation keys respectively displayed on the operation/display unit, in which each arrangement pattern is shown, corresponding to the number of the operation keys. Further, FIG. 12 is the diagram showing the contents of display on the operation/display unit, when the position and/or size of the region for displaying the count result on the banknotes is changed on the display/operation unit.

First, referring to FIGS. 1 and 2, the construction of the banknote handling apparatus of this embodiment will be discussed. In general, the banknote handling apparatus, as shown in FIG. 1 and the other related drawings, is configured to take the banknotes, one by one, from the exterior into the casing thereof, and recognize and count the number, about such banknotes taken into the casing, and then allow these banknotes to be stacked into each stacking unit, corresponding to each denomination of the banknotes.

More specifically, the banknote handling apparatus 10 includes a casing 12, a banknote take-in unit 14 adapted for taking the banknotes, one by one, into the casing 12, and a transport unit 20 provided in the casing 12 and adapted for transporting the banknotes taken into the casing 12 by the take-in unit 14, one by one. The banknote take-in unit 14 includes a hopper configured for allowing the operator to place therein the plurality of banknotes in a stacked condition, and a feeding mechanism adapted for feeding the banknotes stacked in the hopper, one by one, into the casing 12. Further, a recognition unit 22 is provided to the transport unit 20 in the casing 12. This recognition unit 22 can serve to recognize the denomination, authentication, fitness and the like of each banknote transported by the transport unit 20, as well as count the number of such banknotes. In addition, the banknote handling apparatus 10 includes a plurality of (e.g., four) stacking units 16*a* to 16*d* and a plurality of (e.g., two) reject units 18*a*, 18*b*. In this case, each banknote recognized as a counterfeit banknote by the recognition unit 22 and/or each banknote that cannot be recognized by the recognition unit 22, among the banknotes respectively taken into the casing 12 by the banknote take-in unit 14, will be transported, as a rejected banknote, to either one of the reject units 18*a*, 18*b*, by the transport unit 20. Meanwhile, each banknote recognized as a genuine banknote by the recognition unit 22, among the banknotes respectively taken into the casing 12 by the banknote take-in unit 14, will be transported to any one of the stacking units 16*a* to 16*b*, for example, for each denomination of money thereof, by the transport unit 20, and then stacked in this stacking unit. Each of the stacking units 16*a* to 16*d* is opened to the exterior of the casing 12, thus allowing the operator to take out the banknotes respectively stacked in such stacking units 16*a* to 16*d*, from the casing 12. Similarly, each of the reject units 18*a*, 18*b* is also opened to the exterior of the casing 12, as such the operator can take out the rejected banknotes respectively stacked in such reject units 18*a*, 18*b*, from the casing 12.

Figure 4:
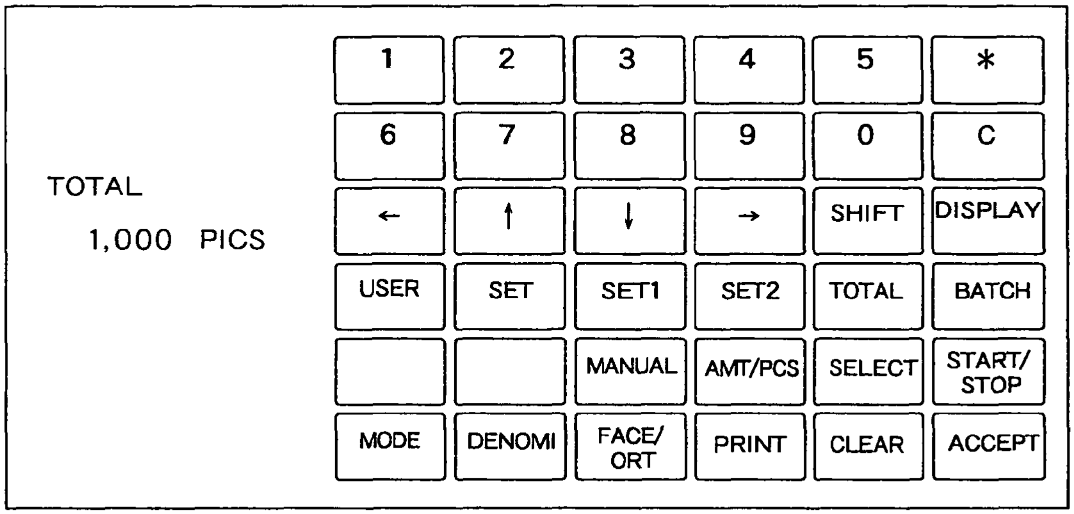

As shown in FIG. 1, an operation/display unit 30 composed of, for example, a touch panel or the like, is provided to the front face of the casing 12, such that the count result on the banknotes counted by the recognition unit 22 can be displayed on the operation/display unit 30. More specifically, as shown in FIG. 4, the count number of all of the banknotes, respectively recognized as the genuine banknotes by the recognition unit 22, can be displayed on the operation/display unit 30. Please note that the count number of such banknotes, for each denomination of money thereof, can be displayed on the operation/display unit 30. Further, as shown in FIG. 4, the operation/display unit 30 can display thereon the various operation keys, such as a START/STOP key, ACCEPT key, CLEAR key, numeric keys (0 to 9) and the like. Thus, when the operator pushes any one of such various operation keys respectively displayed on the operation/display unit 30, the instruction corresponding to this operation key is sent to a control unit 40 as will be described below.

Namely, as shown in FIG. 2, the banknote handling apparatus 10 further includes the control unit 40 adapted for controlling each component of the banknote handling apparatus 10. This control unit 40 is provided in the casing 12 of the banknote handling apparatus 10. In this case, the banknote take-in unit 14, transport unit 20, recognition unit 22, operation/display unit 30 and the like are connected to the control unit 40, respectively. The information concerning the recognition result and count result on the banknotes, obtained by the recognition unit 22, can be sent to the control unit 40. Further, as described above, various instructions can be sent to the control unit 40, by the operator, from the operation/display unit 30. The control unit 40 is configured to send instructions to the banknote take-in unit 14, transport unit 20, operation/display unit 30 and the like, thereby to control such components.

Further, as shown in FIG. 2, a setting unit 32 and memory unit 34 are respectively connected with the control unit 40. The memory unit 34 serves to store therein the recognition result and count result on the banknotes, obtained by the recognition unit 22. Further, this memory unit 34 can serve to store therein existence or nonexistence of display, contents of display, display-position information and conditions of display, for the various operation keys, respectively. As used herein, the "existence or nonexistence of display" means setting for each operation key to be displayed or not to be displayed on the operation/display unit 30. Please note that the setting of the existence or nonexistence of display is performed for each operation key. Further, as used herein, the "contents of display" of each operation key means an icon of each operation key. More specifically, as the contents of display respectively provided for the various operation keys, as shown in FIG. 4, the icons of characters, such as "ACCEPT" and the like, icons of numerals, such as "3" and the like, and icons of symbols, such as "← (left-pointing arrow)" and the like, are included. The "display-position information" on the various operation keys is the respective coordinates of start and end points of each icon on the operation/display unit 30. More specifically, the operation/display unit 30 is composed of a two-dimensional plane having a horizontal X-axis and a vertical Y-axis, and a certain X-coordinate and a certain Y-coordinate are respectively assigned to set the coordinates of each of the start and end points of a certain icon. For instance, when the coordinates of the start point of the certain icon are (20 (X-coordinate), 40 (Y-coordinate)), while the coordinates of the end point of this icon are (50 (X-coordinate), 80 (Y-coordinate)), the content of this icon (such as the character "ACCEPT", numeral "3" or the like) is displayed, in such a region as defined within a range of from 20 to 50 X-coordinates as well as from 40 to 80 Y-coordinates, on the operation/display unit 30. If the region in which the certain icon is displayed is set to be relatively large, the content of this icon will be displayed in a correspondingly large size, while if the region in which the certain icon is displayed is set to be relatively small, the content of such an icon will be displayed in a correspondingly small size.

As used herein, the "conditions of display" of the various operation keys include at least one of frequency in use, display position, size, shape and color of each operation key. Now, referring to FIG. 10, such conditions of display of each operation key will be discussed. FIG. 10 shows the table for illustrating the conditions of display and existence or nonexistence of display, provided for the various operation keys. More specifically, the "frequency in use" of each operation key means the frequency, with which the operator pushes the operation key, with five grades, by way of example. For instance, the frequency in use of the START/STOP key that is frequently used is shown by the grade 5, while the frequency in use of a MODE key that is not so frequently used is designated by the grade 1. In addition, the frequency in use of each numeral key (0 to 9) that is sometimes used is shown by the grade 3. Further, as used herein, the "display position" of each operation key indicates the rough position of the operation key when it is displayed on the operation/display unit 30. For instance, such a display position indicates a "right upper position", a "lower position", a "central position", a "central and lower position" or the like. Similarly, as used herein, the "size" of each operation key indicates the rough size of the operation key when it is displayed on the operation/display unit 30. For instance, such a size means a "large size", a "medium size", a "small size" or the like. Additionally, as used herein, the "shape" of each operation key means the shape of the operation key when it is displayed on the operation/display unit 30. For instance, such a shape includes a "rectangle", a "triangle", a "circle" and the like. Further, as used herein, the "color" of each operation key means the color of the operation key when it is displayed on the operation/display unit 30. For instance, such a color includes a "red", a "blue", a "yellow" and the like.

The setting unit 32 can serve to set the existence or nonexistence of display for each operation key. More specifically, once the existence or nonexistence of display for each operation key is set by the operator via the operation/display unit 30, the instruction regarding the existence or nonexistence of display for each operation key is sent to the control unit 40. Then, the setting unit 32 sets the existence or nonexistence of display for each operation key. Thereafter, the information on the existence or nonexistence of display for each operation key set by the setting unit 32 is stored in the memory unit 34. As shown in FIG. 10, such setting of the existence or nonexistence of display is performed for each of the operation keys.

The control unit 40 can serve to calculate the display-position information on each operation key, based on the conditions of display stored in the memory unit 34, for only the operation key or keys, among the various operation keys, respectively set to be displayed, by the setting unit 32 (e.g., for only the operation key or keys respectively indicated by the character "O" in a column of "Existence or nonexistence of display" in FIG. 10). Then, the control unit 40 makes the operation/display unit 30 display thereon the count result on the banknotes as well as display thereon each operation key set to be displayed, in the display position and size based on the display-position information on each operation key. The details of such control performed by the control unit 40 will be discussed later.

Further, as shown in FIG. 2, an interface 36 is connected with the control unit 40. Thus, the control unit 40 can receive and transmit a signal, relative to an external apparatus, such as a higher-ranking machine or the like, via the interface 36.

Next, the operation of the banknote handling apparatus 10 constructed as described above will be discussed. Namely, this operation is performed as follows, with the control unit 40 controlling the respective components of the banknote handling apparatus 10.

First, the operation of the banknote handling apparatus 10 itself will be described briefly. First, the operator places the banknotes, in the stacked condition, in the hopper of the banknote take-in unit 14 of the banknote handling apparatus 10. Then, once the operator pushes the START/STOP key on the operation/display unit 30 to give an instruction for starting the handling of the banknotes to the control unit 40, the feeding mechanism of the banknote handling apparatus 14 feeds the banknotes placed in the hopper, one by one, into the casing 12, and then each banknote fed into the casing 12 is transported in the casing 12 by the transport unit 20. Thereafter, each banknote transported by the transport unit 20 is recognized and counted by the recognition unit 22. In this case, each banknote recognized as the counterfeit banknote by the recognition unit 22 and/or each banknote that cannot be recognized by the recognition unit 22, among the banknotes respectively taken into the casing 12, is transported, as the rejected banknote, to either one of the reject units 18*a*, 18*b*, by the transport unit 20. Meanwhile, each banknote recognized as the genuine banknote by the recognition unit 22, among the banknotes respectively taken into the casing 12, is transported to any one of the stacking units 16*a* to 16*b*, for each denomination of money thereof, by the transport unit 20, and then stacked in this transport unit. Then, the operator takes out the banknotes, respectively stacked in each of the stacking units 16*a* to 16*d* and/or reject units 18*a*, 18*b*, in a batch form. The count result on the banknotes counted by the recognition unit 22 is displayed on the operation/display unit 30. During a normal operation mode of the banknote handling apparatus 10 as described above, a standard operation screen, as shown in FIG. 4, is displayed, on the operation/display unit 30.

Now, with respect to the banknote handling apparatus 10 of this embodiment, the operation for changing the display layout of the various operation keys on the operation/display unit 30 will be discussed. FIG. 3 is the flow chart showing the operation for changing the display layout of the various operation keys on the operation/display unit 30. Further, FIGS. 4 through 9 are provided for respectively illustrating the contents of display on the operation/display unit 30, when the display layout of the various operation keys on this operation/display unit is changed.

As described above, during the normal operation mode of the banknote handling apparatus 10, the control unit 40 makes the operation/display unit 30 display thereon the standard operation screen (see STEP 1 shown in FIG. 3). More specifically, on the operation/display unit 30, the count result on the banknotes counted by the recognition unit 22 is displayed, as well as the various operation keys are displayed. FIG. 4 shows the contents of display on the operation/display unit 30 when the control unit 40 makes the operation/display unit 30 display thereon the standard operation screen. As shown in FIG. 4, on the operation/display unit 30, the count number, e.g., 1000, of all of the banknotes is displayed, together with the various operations keys. In this state of the operation/display unit 30 as shown in FIG. 4, when the operator pushes any one of the operation keys, the instruction corresponding to this operation key is sent to the control unit 40, and then the control unit 40 controls the respective components to carry out such an instruction inputted by the operator.

Figure 5:
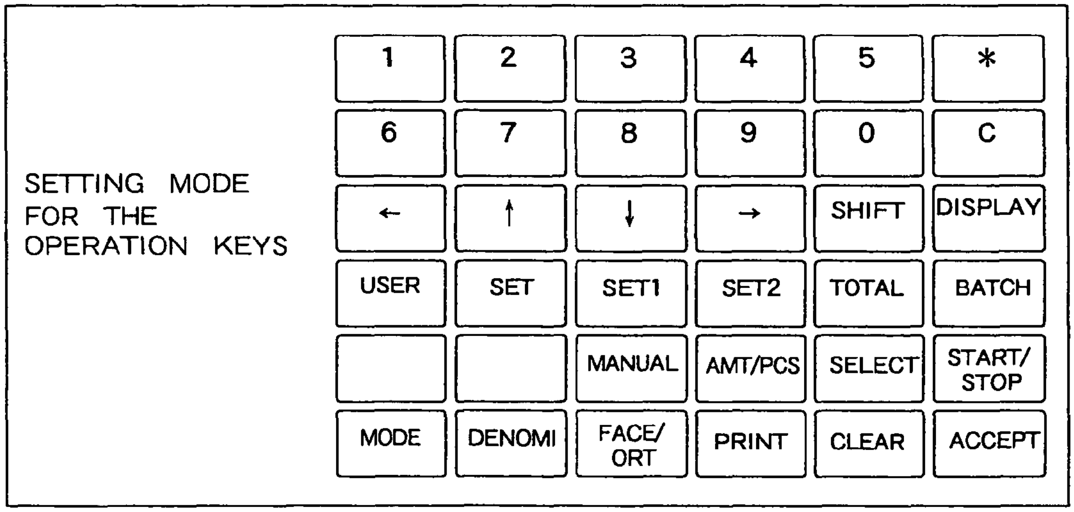
FIG. 5 is a diagram showing the contents of display on the operation/display unit of the banknote handling apparatus shown in FIG. 1 or the like, illustrating a setting screen, for the various operation keys, displayed on the operation/display unit.
Figure 6:
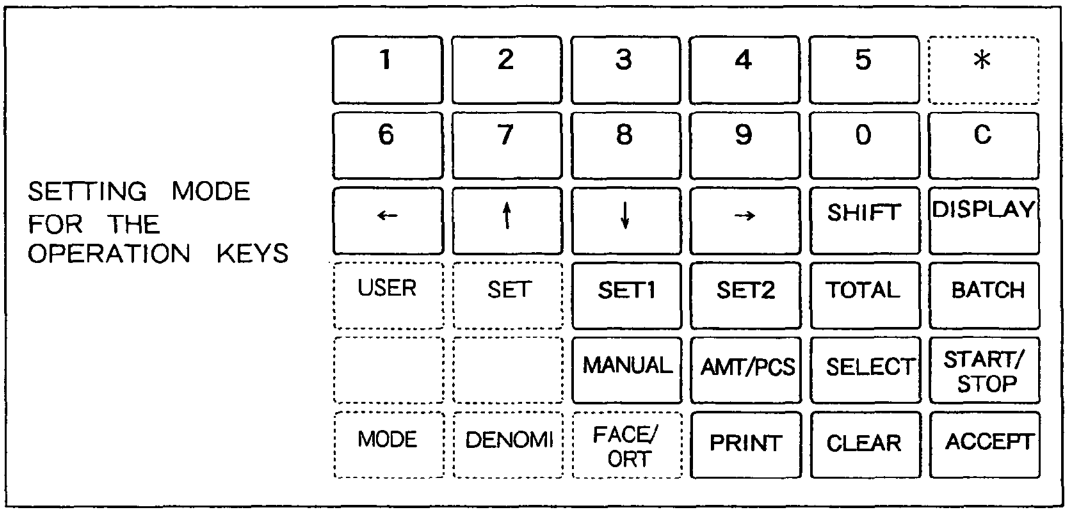
FIG. 6 is a diagram showing the contents of display on the operation/display unit of the banknote handling apparatus shown in FIG. 1 or the like, illustrating the contents of display when the existence or nonexistence of display for the various operation keys is set, in a setting mode of the operation keys.
Figure 8:
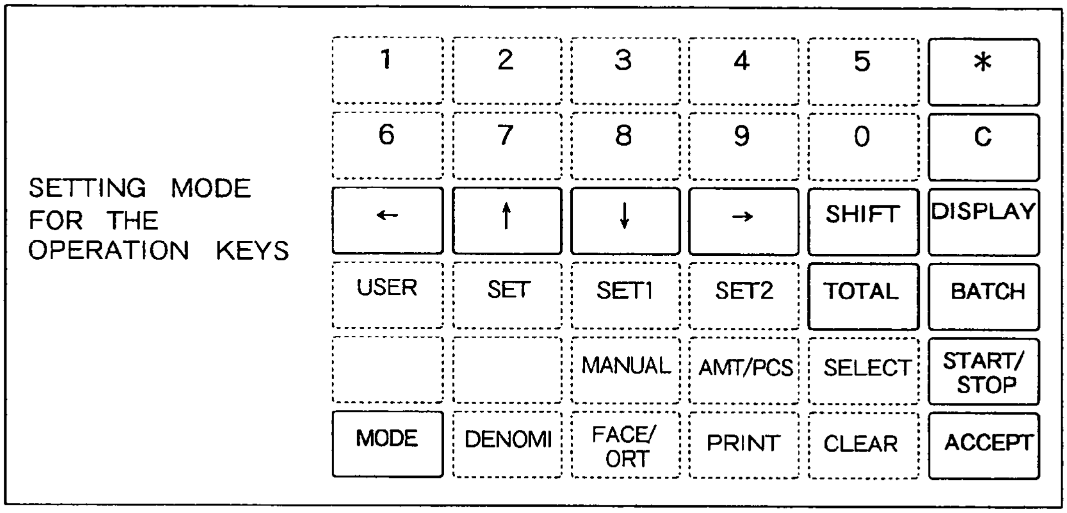
FIG. 8 is a diagram showing the contents of display on the operation/display unit of the banknote handling apparatus shown in FIG. 1 or the like, illustrating the contents of display when the existence or nonexistence of display for the various operation keys is set, in the setting mode of the operation keys.

Further, during the normal operation mode of the banknote handling apparatus 10, once the instruction for introducing the setting mode for the various operation keys is provided by the operator via the operation/display unit 30 (see "YES" in STEP 2 shown in FIG. 3), the contents of display on the operation/display unit 30 is changed into the setting screen as shown in FIG. 5 (see STEP 3 shown in FIG. 3). In this setting mode for the various operation keys, all of the operation keys are displayed on the setting screen. In this state, some operation keys respectively set to be displayed on the operation/display unit 30 during the normal operation mode are displayed in a different manner from the other operations keys respectively set not to be displayed on the operation/display unit 30. For instance, on this setting screen, each operation key set to be displayed on the operation/display unit 30 during the normal operation mode is displayed with a dark color, while the other operation keys respectively set not to be displayed are displayed with a light color. Alternatively, each operation key set to be displayed on the operation/display unit 30 during the normal operation mode may be displayed with a different color from the color of the other operation keys respectively set not to be displayed. Please note that in each of the setting screens, as shown in FIGS. 5, 6 and 8, for the various operation keys on the operation/display unit 30, each operation key set to be displayed on the operation/display unit 30 during the normal operation mode is indicated by a solid line, while the other operation keys respectively set not to be displayed are depicted by a dotted line.

In the setting mode for the various operation keys, when the operator pushes any one of the various operation keys respectively displayed on the setting screen of the operation/display unit 30 (see "YES" in STEP 4 shown in FIG. 3), the existence or nonexistence of display for such a pushed operation key is changed by the setting unit 32 (see STEP 5 shown in FIG. 3). For instance, if a SHIFT key is set to be displayed on the operation/display unit 30 during the normal operation mode, and when the operator pushes this SHIFT key on the setting screen of the operation/display unit 30, the existence or nonexistence of display for the SHIFT key is changed by the setting unit 32, such that this SHIFT key is not displayed on the operation/display unit 30 during the normal operation mode. In this case, the display of such a SHIFT key by the solid line on the setting screen of the operation/display unit 30 is changed into the indication by the dotted line. Meanwhile, if the SHIFT key is set not to be displayed on the operation/display unit 30 during the normal operation mode, and when the operator pushes this SHIFT key on the setting screen of the operation/display unit 30, the existence or nonexistence of display for the SHIFT key is returned by the setting unit 32, such that this SHIFT key is displayed on the operation/display unit 30 during the normal operation mode. In this case, the display of such a SHIFT key by the dotted line on the setting screen of the operation/display unit 30 is changed into the indication by the solid line. In this manner, when the operator sets the existence or nonexistence of display for each operation key in the normal operation mode on the operation/display unit 30, the setting unit 32 sets the existence or nonexistence of display for each operation key (see the column of "Existence or nonexistence of display" in FIG. 10).

Once the setting of the existence or nonexistence of display for each operation key during the setting mode is completed (see "YES" in STEP 6 shown in FIG. 3), this setting mode is ended (see STEP 7 shown in FIG. 3). Thereafter, the control unit 40 makes the operation/display unit 30 display thereon the standard operation screen (see STEP 8 shown in FIG. 3). At this time, the control unit 40 calculates the display-position information on each operation key (i.e., the coordinates of each of the start and end points of the icon of each operation key), based on the conditions of display stored in the memory unit 34, for only the operation key or keys, among the various operation keys, respectively set, by the setting unit 32, to be displayed on the operation/display unit 30. Then, the control unit 40 makes the operation/display unit 30 display thereon each operation key set to be displayed, in the display position and size based on the display-position information on each operation key. In this case, the control unit 40 calculates the display-position information on each operation key, such that each region for displaying each operation key for a part or all of the operation keys on operation/display unit 30, can be enlarged, with decrease of the number of the operation keys, among the various operation keys, respectively set, by the setting unit 32, to be displayed on the operation/display unit 30.

Figure 7:
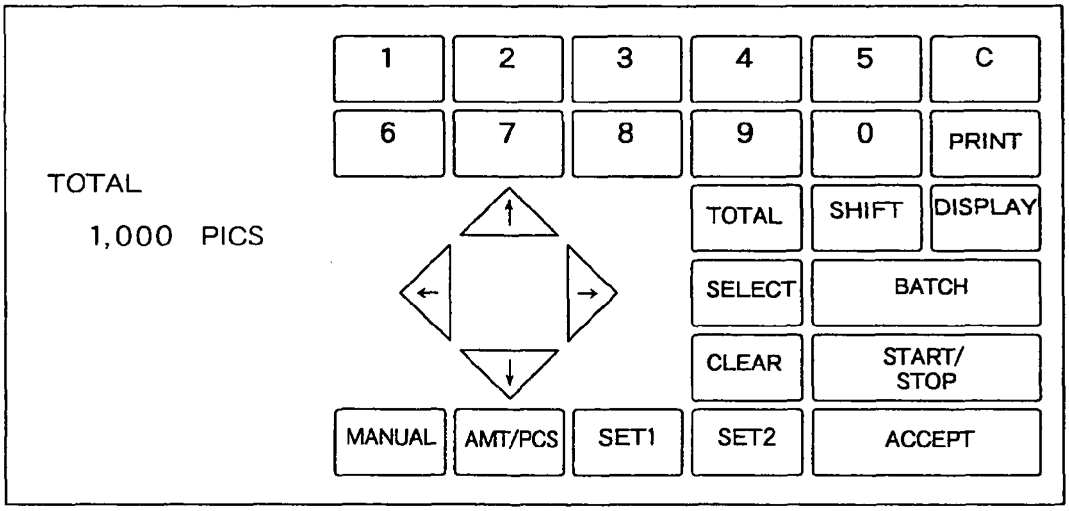
FIG. 7 is a diagram showing the contents of display on the operation/display unit of the banknote handling apparatus shown in FIG. 1 or the like, illustrating the contents of display on the operation/display unit after the existence or nonexistence of display for the various operation keys, as shown in FIG. 6, has been set.

Now, referring to FIGS. 6 through 9, the control performed by the control unit 40 as described above will be discussed in more detail. In the setting mode for the various operation keys, as shown in FIG. 6, when the setting of the existence or nonexistence of display is performed, for the various operation keys, so as to set a total of twenty-eight operation keys to be displayed as well as to set a total of eight operation keys not to be displayed, such various operation keys are displayed on the operation/display unit 30, as shown in FIG. 7, after this setting mode for the various operation keys is ended and the resultant standard operation screen is displayed on the operation/display unit 30. More specifically, among the operation keys set to be displayed in the normal operation mode on the operation/display unit 30 during the setting mode for the various operation keys, a BATCH key, the START/STOP key and ACCEPT key are respectively changed into twice the size thereof, as compared with the size thereof before the existence or nonexistence of display for such operation keys is changed. Further, four arrow keys, among the operation keys respectively set to be displayed in the normal operation mode on the operation/display unit 30, are respectively changed into the triangular shape from the rectangular shape thereof, and newly arranged in positions respectively corresponding to the content of each arrow key (e.g., the arrow key "→ (right-pointing arrow)" indicating the right direction is located in a relatively right position, among the four arrow keys). In addition, after the existence or nonexistence of display is changed and the resultant standard operation screen is displayed on the operation/display unit 30, the interval between the operation keys can be widened, with the decrease of the number of the operation keys set to be displayed on the operation/display unit 30, among the various operation keys.

Figure 9:
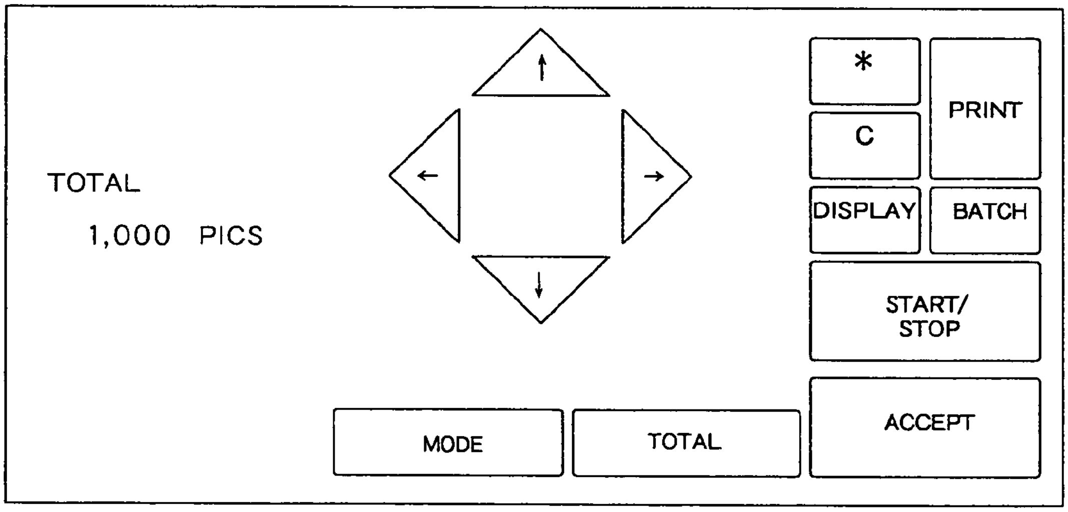
FIG. 9 is a diagram showing the contents of display on the operation/display unit of the banknote handling apparatus shown in FIG. 1 or the like, illustrating the contents of display on the operation/display unit after the existence or nonexistence of display for the various operation keys, as shown in FIG. 8, has been set.

Further, in the setting mode for the various operation keys, as shown in FIG. 8, when the setting of the existence or nonexistence of display is performed, for the various operation keys, so as to set a total of thirteen operation keys to be displayed as well as to set a total of twenty three operation keys not to be displayed, such various operation keys are displayed on the operation/display unit 30, as shown in FIG. 9, after this setting mode for the various operation keys is ended and the resultant standard operation screen is displayed on the operation/display unit 30. More specifically, among the operation keys set to be displayed in the normal operation mode on the operation/display unit 30 during the setting mode for the various operation keys, the ACCEPT key, START/STOP key, SHIFT key, MODE key, and TOTAL key are respectively enlarged, as compared with the size thereof before the existence or nonexistence of display for such operation keys is changed. Further, the four arrow keys, among the operation keys respectively set to be displayed in the normal operation mode on the operation/display unit 30, are respectively changed into the triangular shape from the rectangular shape thereof, and newly arranged in positions respectively corresponding to the content of each arrow key. In addition, each arrow key is enlarged on the screen, as compared with the case shown in FIG. 7. Additionally, on the resultant standard operation screen of the operation/display unit 30, as shown in FIG. 9, enough intervals between certain operation keys can be obtained.

In this embodiment, which operation key is changed, in the size, shape, color, display position and/or the like, among the operation keys set to be displayed on the operation/display unit 30 in the setting mode for the various operation keys, is determined, based on the conditions of display, for each operation key stored in the memory unit 34, such as the frequency in use, display position, size, shape, color and the like of each operation key. For instance, since the frequency in use of the ACCEPT key and START/STOP key stored in the memory unit 34 is relatively high, as compared with the frequency in use of the other operation keys, such an ACCEPT key and/or START/STOP key are preferentially enlarged and/or located in a relatively central position on the operation/display unit 30, with the decrease of the number of the operation keys set to be displayed on the operation/display unit 30. Further, each arrow key may have a special shape and/or display position stored in the memory unit 34, and hence each arrow key is changed, preferentially, in the size and/or display position, as shown in FIGS. 7 and/or 9, with the decrease of the number of the operation keys set to be displayed on the operation/display unit 30. Meanwhile, since the frequency in use of a DISPLAY key or the like stored in the memory unit 34 is relatively low, as compared with the frequency in use of the other operation keys, such an operation key is not enlarged, while being located at or around a peripheral or corner point on the operation/display unit 30, even when the number of the operation keys set to be displayed on the operation/display unit 30 is decreased. In this manner, even in the case the conditions of display of the various operation keys are respectively set in advance as shown in FIG. 10, the conditions of display of some operation keys may have no effect on the display that will be actually created on the operation/display unit 30.

In this embodiment, the control unit 40 may be configured to calculate the display-position information, based on a degree of importance for each operation key calculated under the conditions of display of the operation key stored in the memory unit 34. Namely, for each operation key set to be displayed on the operation/display unit 30 by the setting unit 32, an evaluation value is calculated, based on the frequency in use, display position, size, shape, color and the like of this operation key, respectively stored in the memory unit 34 (see FIG. 10). For instance, in regard to the frequency in use of each operation key, the degree of the frequency in use is directly used as the evaluation value. Meanwhile, in regard to the display position of each operation key, for example, 5 is assigned to the "central" position, 3 is assigned to the "central and lower", "central and right" or the like position, and 1 is assigned to the "right upper", "right lower" or the like position, respectively, as the evaluation value. Further, for the size of each operation key, for example, 5 is assigned to the "large" size, 3 is assigned to the "medium" size, and 1 is assigned to the "small" size, respectively, as the evaluation value. In addition, for the shape of each operation key, for example, 3 is assigned to the "circular" or "triangular" shape, and 1 is assigned to the "rectangular" shape, respectively, as the evaluation value. Further, in regard to the color of each operation key, for example, 5 is assigned to the "red" color, 3 is assigned to the "blue" color, and 1 is assigned to the "yellow" color, as the evaluation value. It is noted that the evaluation value for each operation key is calculated as the total value of the respective evaluation values of the frequency in use, display position, size, shape, color and the like, respectively assigned to this operation key. Then, if the evaluation value of some operation key is relatively high, the control unit 40 increases the size of this operation key, arrange this operation key in a further central position on the operation/display unit 30, and/or change the shape and/or color of this operation key, preferentially, according to the degree of importance, i.e., the evaluation value, of the operation key. Meanwhile, if the evaluation value of some operation key is relatively low, the control unit 40 may not change the size of such an operation key, and/or may arrange this operation key at a peripheral or corner point on the operation/display unit 30, and/or may not change the shape and/or color of this operation key. Accordingly, the conditions of display of the operation key having a relatively small evaluation value may have no effect on the display actually created on the operation/display unit 30.

Further, the control unit 40 may calculate the display-position information, based on an order of priority of each operation key calculated under the conditions of display of each operation key stored in the memory unit 34. More specifically, for each operation key set to be displayed on the operation/display unit 30 by the setting unit 32, the control unit 40 first calculates the evaluation value, based on the frequency in use, display position, size, shape, color and the like of each operation key, respectively stored in the memory unit 34, and then sets the order of priority of each operation key, based on the evaluation value of each operation key. Namely, for each operation key, the order of priority is set, in order of the evaluation value of each operation key. Then, if the order of priority of some operation key is relatively high, the control unit increases the size of this operation key, arrange this operation key in a further central position on the operation/display unit 30, and/or change the shape and/or color of this operation key, preferentially, according to the order of priority of the operation key. Meanwhile, if the order of priority of some operation key is relatively low, the control unit 40 may not change the size of such an operation key, and/or may arrange this operation key at a peripheral or corner point on the operation/display unit 30, and/or may not change the shape and/or color of this operation key.

In the setting mode for the various operation keys, the conditions of display of each operation key may be set, in addition to the existence or nonexistence of display for each operation key. In this case, the setting of the conditions of display of each operation key may be performed by the setting unit 32, in the same manner as the existence or nonexistence of display for each operation key. More specifically, the operator can change the conditions of display, such as the frequency in use, display position, size, shape, color and the like, of each operation key, via the operation/display unit 30. For instance, in the setting mode for the various operation keys as shown in FIG. 5, the color of each operation key may be changed, in the order of the red color, blue color, yellow color and grey color, each time the operator pushes each operation key displayed on the operation/display unit 30. Further, when the operator pushes one operation key of the grey color, the color of this operation key may be returned to the red color. In this case, if the color of a certain operation key is red, blue or yellow, this operation key can be considered as one set to be displayed in the normal operation mode on the operation/display unit 30. Meanwhile, if the color of the operation key is grey, this operation key can be considered as one set not to be displayed in the normal operation mode on the operation/display unit 30. Further, in this case, once the color of any one operation key is changed into red, blue or yellow, the frequency in use of this operation key may be automatically set at 5, 3 or 1, or otherwise the size of this operation key may be automatically set at the "large" size, "medium" size or "small" size. In addition, when the operator changes the conditions of display of any one operation key, the display-position information on each operation key may be changed, with the change of the evaluation value of the above operation key.

In another method for calculating the display-position information, the memory unit 34 may store therein, in advance, a plurality of arrangement patterns, respectively provided, corresponding to the number of the operation keys to be displayed on the operation/display unit 30. In this case, the control unit 40 may calculate the display-position information on each operation key, based on the arrangement patterns corresponding to the number of the operation keys and stored in the memory unit 34 as well as on the conditions of display stored in the memory unit 34, for only the operation key or keys, among the various operation keys, respectively set to be displayed on the operation/display unit 30, by the setting unit 32. More specifically, as shown in FIG. 11, the arrangement patterns for the operation keys are set, respectively, corresponding to the number of the operation keys, set to be displayed on the operation/display unit 30, by the setting unit 32. It is noted that each numeral displayed on each display screen shown in FIG. 11 indicates the order of priority of each corresponding operation key. Namely, the operation key of the first order of priority is located at each point denoted by the numeral "1" in FIG. 11, while the operation key of the second order of priority is located at each point denoted by the numeral "2" in FIG. 11. Of course, while the arrangement patterns, respectively provided for three, five and ten operation keys, are shown in FIG. 11, by way of example, the memory unit 34 may store therein any other suitable arrangement patterns, than those arrangement patterns for the three, five and ten operation keys. In this case, the control unit 40 calculates the display-position information on each operation key, based on the order of priority of this operation key set in advance by the control unit 40, such that the arrangement location of the operation key can be matched with each corresponding arrangement pattern stored in the memory unit 34.

As described above, according to the banknote handling apparatus 10 of this embodiment, the operation/display unit 30 can serve to display thereon the count result on the banknotes, as well as display thereon a part or all of the various operation keys, based on the existence or nonexistence of display, contents of display, display-position information and conditions of display, for those operation keys respectively stored in the memory unit 34. Further, the existence or nonexistence of display for the various operation keys can be set by the setting unit 32, and the display-position information on each operation key can be calculated, based on the conditions of display stored in the memory unit 34, for only the operation key or keys, among the various operation keys, respectively set, by the setting unit 32, to be displayed on the operation/display unit 30. In addition, the operation/display unit 30 is controlled to display thereon the count result on the banknotes as well as to display thereon each operation key set to be displayed, in the display position and size based on the display-position information on each operation key. Therefore, once the operator sets the existence or nonexistence of display for each operation key to be displayed on the operation/display unit 30, only the operation key or keys set to be displayed, among the various operation keys, can be displayed on the operation/display unit 30, while the display position and size of each displayed operation key can be changed such that the operator can readily operate this operation key. As such, the operability of the operation/display unit 30 can be significantly enhanced.

Further, as described above, in the banknote handling apparatus 10 of this embodiment, the conditions of display of each operation key includes at least one of the frequency in use, display position, size, shape and color of each operation key (see FIG. 10). In this case, as described above, the setting unit 32 may set the conditions of display of each operation key, in addition to the existence or nonexistence of display for each operation key. Further, the "contents of display" for each operation key may be icon, and the "display-position information" on each operation key is the coordinate of each of the start and end points of each corresponding icon on the operation/display unit 30. In this case, the operation/display unit 30 is composed of the touch panel.

Further, in the banknote handling apparatus 10 of this embodiment, as described above, the control unit 40 can serve to calculate the display-position information on each operation key, such that each region for displaying each operation key for a part or all of the operation keys on operation/display unit 30, can be enlarged, with the decrease of the number of the operation keys, among the various operations keys, respectively set, by the setting unit 32, to be displayed on the operation/display unit 30.

In addition, in the banknote handling apparatus 10 of this embodiment, the control unit 40 may calculate the display-position information on each operation key, based on the degree of importance for each operation key, calculated under the conditions of display of each operation key stored in the memory unit 34. Alternatively, the control unit 40 may calculate the display-position information, based on the order of priority of each operation key, calculated under the conditions of display of each operation key stored in the memory unit 34. Alternatively, as shown in FIG. 11, the plurality of arrangement patterns are stored, in advance, in the memory unit 34, corresponding to the number of the operation keys to be displayed on the operation/display unit 30, the control unit 40 may calculate the display-position information on each operation key, based on the arrangement pattern corresponding to the number of the operation keys and stored in the memory unit 34 as well as on the conditions of display stored in the memory unit 34, for only the operation key or keys, among the various operation keys, respectively set, by the setting unit 32, to be displayed on the operation/display unit 30.

It should be noted that the banknote handling apparatus 10 of this embodiment is not limited to each aspect as described above, but various modifications and/or alterations can be made thereto. For instance, the control unit 40 may change, the position and/or size of the region in which the count result on the banknotes is displayed on the operation/display unit 30, based on the number of the operation keys, among the various operation keys, respectively set, by the setting unit 32, to be displayed on the operation/display unit 30. More specifically, the contents of display of a total of thirty-six operation keys are displayed on the standard operation screen of the operation/display unit 30, as shown in FIG. 4, once the existence or nonexistence of display for the various operation keys is set by the setting unit 32, so as to reduce the number of the operation keys set to be displayed on the operation/display unit 30, from 36 to any suitable number, in the setting mode for the various operation keys, as described in the STEP 3 through STEP 6 in FIG. 3, the region for displaying the count result on the banknotes may be enlarged on the standard operation screen of the operation/display unit 30, as shown in FIG. 12.

As stated above, the only one type of banknote handling apparatus has been described. Now, another case, in which the present invention is applied to a plurality of banknote handling apparatuses of different types, will be described. In the present invention, the same operation/display unit can be commonly used for such different types of banknote handling apparatuses. This operation/display unit is constructed in substantially the same manner as the aforementioned operation/display unit 30 of the banknote handling apparatus 10 shown in FIG. 1 and the other related drawings. Further, in this variation, the memory unit of each banknote handling apparatus can serve to store therein information, for each operation key, on whether or not this operation key is to be used in the banknote handling apparatus. More specifically, as shown in FIG. 13, for each of the plurality of banknote handling, apparatuses of different types A to E, each operation key is set, in advance, to be used or not to be used. For instance, in the banknote handling apparatus of type B, all of the arrow keys are set not to be used. Then, the memory unit can serve to store therein the information on whether or not each operation key is to be used in each of the different types of banknote handling apparatuses. Thus, the control unit of each banknote handling apparatus can serve to calculate the display-position information on each operation key, based on the conditions of display stored in the memory unit, for only the operation key or keys, among the various operation keys, respectively stored, in the memory unit, to be used corresponding to the type of the banknote handling apparatus, as well as set, by the setting unit, to be displayed on the operation/display unit.

As described above, in the case the present invention is applied to the plurality of banknote handling apparatuses of the different types, a part or all of the operation/display unit, memory unit and control unit can be commonly used, when such different types of banknote handling apparatuses are manufactured. Therefore, as compared with the case in which the operation/display unit, memory unit and control unit are prepared for each of such different types of banknote handling apparatuses, the production cost can be significantly reduced.

Further, it should be noted that the banknote handling apparatus of this invention is not limited to the construction of the banknote handling apparatus 10 as shown in FIG. 1 and the other related drawings, but may have any other suitable construction of the banknote handling apparatus. For instance, FIGS. 14 and 15 respectively illustrate such variations of the banknote handling apparatus related to the present invention.

Figure 14:
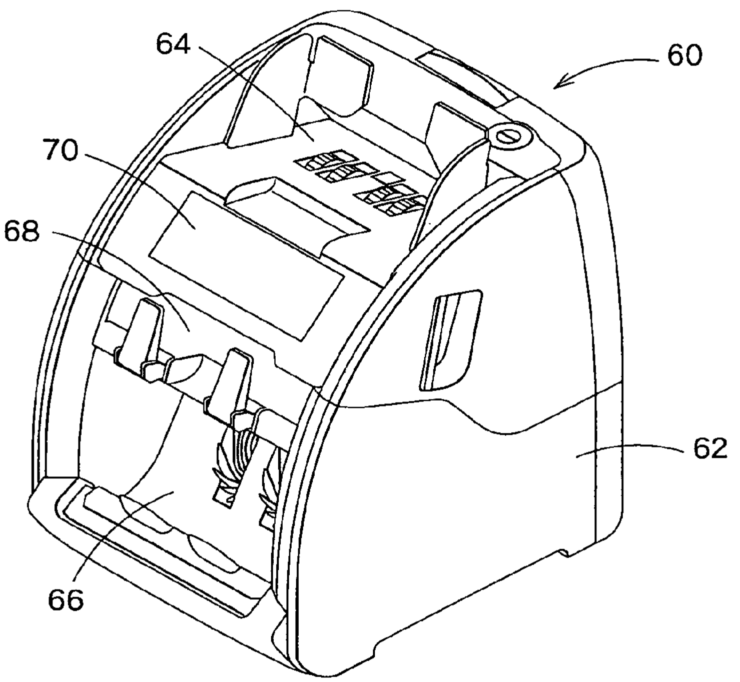
FIG. 14 is a perspective view illustrating another construction of the banknote handling apparatus of this invention.

Namely, a banknote counting apparatus 60, as shown in FIG. 14, includes a casing 62, a banknote take-in unit 64 adapted for taking the banknotes, one by one, into the casing 62, and a transport unit (not shown) provided in the casing 62 and adapted for transporting the banknotes taken into the casing 62 by the take-in unit 64, one by one. The banknote take-in unit 64 includes a hopper configured for allowing the operator to place therein the plurality of banknotes in the stacked condition, and a feeding mechanism adapted for feeding the banknotes stacked in the hopper, one by one, into the casing 62. Further, in the casing 62, a recognition unit (not shown) is provided to the transport unit. This recognition unit can serve to recognize the denomination, authentication, fitness and the like of each banknote transported by the transport unit, as well as count the number of such banknotes. In addition, this banknote counting apparatus 60 includes a stacking unit 66 and a reject unit 68. In this case, each banknote recognized as the counterfeit banknote by the recognition unit and/or each banknote that cannot be recognized by the recognition unit, among the banknotes respectively taken into the casing 62 by the banknote take-in unit 64, is transported, as the rejected banknote, to the reject unit 68, by the transport unit. Meanwhile, each banknote recognized as the genuine banknote by the recognition unit, among the banknotes respectively taken into the casing 62 by the banknote take-in unit 64, is transported to the stacking unit 66, and then stacked in this stacking unit 66. As shown in FIG. 14, the stacking unit 66 and reject unit 68 are respectively opened to the exterior of the casing 62, thus allowing the operator to take out the banknotes respectively stacked in such stacking unit 66 and/or reject unit 68 to the exterior of the casing 62.

Further, as shown in FIG. 14, an operation/display unit 70 composed of, for example, a touch panel or the like, is provided to the front face of the casing 62, such that the count result on the banknotes counted by the recognition unit can be displayed on the operation/display unit 70. This operation/display unit 70 provided to the banknote counting apparatus 60, as shown in FIG. 14, has substantially the same construction as the operation/display unit 30 provided to the banknote handling apparatus 10 shown in FIG. 1 and the other related drawings. Namely, this operation/display unit 70 can serve to display thereon the count result on the banknotes as well as display thereon a part or all of the various operation keys. In addition, in the banknote counting apparatus 60 as shown in FIG. 14, like the banknote handling apparatus 10 as shown in FIG. 1 and the other related drawings, a setting unit adapted for setting the existence or nonexistence of display for each operation key and a memory unit adapted for storing therein such existence or nonexistence of display and the like for each operation key are provided, respectively. Thus, a control unit of this banknote counting apparatus 60 can serve to calculate the display-position information on each operation key, based on conditions of display stored in the memory unit, for only the operation key or keys, among the various operation keys, respectively set, by the setting unit, to be displayed on the operation/display unit 70, and then make the operation/display unit 70 display thereon the count result on the banknotes as well as display thereon each operation key set to be displayed, in the display position and size based on the display-position information on each operation key. It is noted that the memory unit, setting unit and control unit of the banknote counting apparatus 60 shown in FIG. 14 are respectively configured, in substantially the same manner, as the memory unit 34, setting unit 32 and control unit 40 of the banknote handling apparatus 10 shown in FIG. 1.

Figure 15:
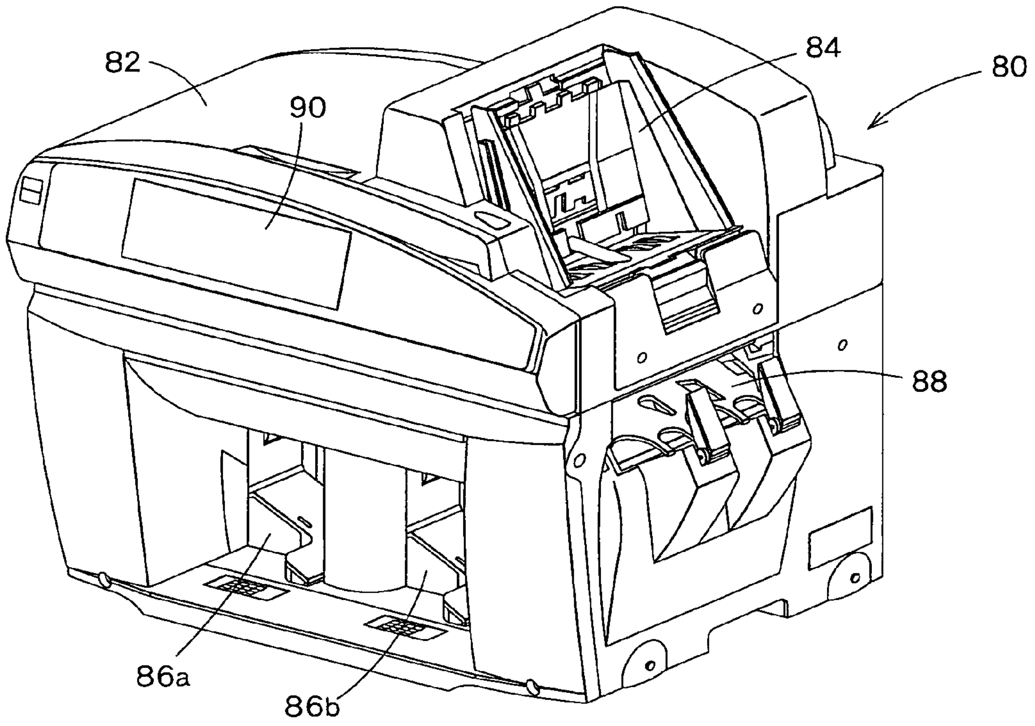
FIG. 15 is a perspective view illustrating still another construction of the banknote handling apparatus of this invention.

A banknote handling apparatus 80 shown in FIG. 15 includes a casing 82, a banknote take-in unit 84 adapted for taking the banknotes, one by one, into the casing 82, and a transport unit (not shown) provided in the casing 82 and adapted for transporting the banknotes taken into the casing 82 by the take-in unit 84, one by one. This banknote take-in unit 84 includes a hopper configured for allowing the operator to place therein the plurality of banknotes in the stacked condition, and a feeding mechanism adapted for feeding the banknotes stacked in the hopper, one by one, into the casing 82. Further, in the casing 82, a recognition unit (not shown) is provided to the transport unit. This recognition unit can serve to recognize the denomination, authentication, fitness and the like of each banknote transported by the transport unit, as well as count the number of such banknotes. In addition, this banknote handling apparatus 80 includes two stacking units 86*a*, 86*b* and one reject unit 88. In this case, each banknote recognized as the counterfeit banknote by the recognition unit and/or each banknote that cannot be recognized by the recognition unit, among the banknotes respectively taken into the casing 82 by the banknote take-in unit 84, is transported, as the rejected banknote, to the reject unit 88, by the transport unit. Meanwhile, each banknote recognized as the genuine banknote by the recognition unit, among the banknotes respectively taken into the casing 82 by the banknote take-in unit 84, is transported to either one of the stacking units 86*a*, 86*b*, and then stacked in the stacking unit. The stacking units 86*a*, 86*b* are respectively opened to the exterior of the casing 82, thus allowing the operator to take out the banknotes respectively stacked in such stacking units 86*a*, 86*b* to the exterior of the casing 82. Similarly, the reject unit 88 is also opened to the exterior of the casing 82, as such the operator can take out the rejected banknotes respectively stacked in this reject unit 88 to the outside of the casing 82.

As shown in FIG. 15, an operation/display unit 90 composed of, for example, a touch panel or the like, is provided to the front face of the casing 82, such that the count result on the banknotes counted by the recognition unit can be displayed on the operation/display unit 90. This operation/display unit 90 provided to the banknote handling apparatus 80, as shown in FIG. 15 has substantially the same construction as the operation/display unit 30 provided to the banknote handling apparatus 10 shown in FIG. 1 and the other related drawings. Namely, this operation/display unit 90 can serve to display thereon the count result on the banknotes as well as display thereon a part or all of the various operation keys. In addition, in the banknote handling apparatus 80 as shown in FIG. 15, like the banknote handling apparatus 10 as shown in FIG. 1 and the other related drawings, a setting unit adapted for setting the existence or nonexistence of display for each operation key and a memory unit adapted for storing therein such existence or nonexistence of display and the like for each operation key are provided, respectively. Thus, a control unit of this banknote handling apparatus 80 can serve to calculate the display-position information on each operation key, based on conditions of display stored in the memory unit, for only the operation key or keys, among the various operation keys, respectively set, by the setting unit, to be displayed on the operation/display unit 90, and then make the operation/display unit 90 display thereon the count result on the banknotes as well as display thereon each operation key set to be displayed, in the display position and size based on the display-position information on each operation key. It is noted that the memory unit, setting unit and control unit of this banknote handling apparatus 80 shown in FIG. 15 are respectively configured, in substantially the same manner, as the memory unit 34, setting unit 32 and control unit 40 of the banknote handling apparatus 10 shown in FIG. 1.

It is noted that the money handling apparatus related to this invention is not limited to the banknote handling apparatus adapted for handling the banknotes. For instance, any proper coin handling apparatus adapted for handling coins can also be used as the money handling apparatus of this invention. In the case the coin handling apparatus is used as the money handling apparatus of this invention, the operation/display unit can serve to display thereon the count result on the coins as well as display thereon a part or all of the various operation keys. In still another variation, any suitable combination of the banknote handling apparatus and coin handling apparatus can also be used as the money handling apparatus related to this invention. In the case such a combination of the banknote handling apparatus and coin handling apparatus is used as the money handling apparatus of this invention, the operation/display unit can serve to display thereon each count result on the banknotes and coins as well as display thereon a part or all of the various operation keys.

The invention claimed is:

1. A money handling apparatus, comprising:

a memory unit configured to store therein existence or nonexistence of display, contents of display, display-position information and one or more conditions of display, for various operation keys, respectively;

an operation/display unit configured to display thereon a count result on money as well as configured to display thereon a part or all of the various operation keys, based on the existence or nonexistence of display, contents of display, display-position information and one or more conditions of display, for the various operation keys, respectively stored in the memory unit;

a setting unit configured to set the existence or nonexistence of display for each operation key and a control unit configured to display each operation key on the operation/display unit during a setting mode and to calculate the display-position information on each operation key, based on one or more conditions of display stored in the memory unit, for the operation key or keys, among the various operation keys, respectively set, to be displayed during a normal operation mode on the operation/display unit, as well as configured to make the operation/display unit display thereon the count result during the normal operation mode and display thereon each operation key set to be displayed, in the display position and size based on the display-position information during the normal operation mode, the control unit configured to display the operation key or keys on the operation/display unit in a different manner between the time during the setting mode and the time during the normal operation mode, wherein when a certain operation key displayed on the operation/display unit is pushed, an instruction corresponding to this operation key is sent to the control unit.

2. The money handling apparatus according to claim 1, wherein the control unit is configured to change the position and/or size of a region, in which the count result on the money is displayed on the operation/display unit, based on the number of the operation keys, among the various operation keys, respectively set, by the setting unit, to be displayed on the operation/display unit.

3. The money handling apparatus according to claim 1, wherein the control unit is configured to calculate the display-position information on each operation key, such that a region, in which a part or all of the operation keys are respectively displayed on the operation/display unit, is enlarged, with decrease of the number of the operation keys, among the various operation keys, respectively set, by the setting unit, to be displayed on the operation/display unit.

4. The money handling apparatus according to claim 1, wherein one or more conditions of display of each operation key includes at least one of frequency in use, display position, size, shape and color, of the operation key.

5. The money handling apparatus according to claim 1, wherein the setting unit is configured to set the existence or nonexistence of display for each operation key, as well as configured to set one or more conditions of display of each operation key.

6. The money handling apparatus according to claim 1, wherein the control unit calculates the display-position information, based on a degree of importance for each operation key calculated under one or more conditions of display of each operation key stored in the memory unit.

7. The money handling apparatus according to claim 1, wherein the control unit calculates the display-position information, based on an order of priority of each operation key calculated under one or more conditions of display of each operation key stored in the memory unit.

8. The money handling apparatus according to claim 1,
wherein the memory unit stores therein a plurality of arrangement patterns, in advance, corresponding to the number of the operation keys set to be displayed on the operation/display unit, and
the control unit calculates the display-position information on each operation key, based on the arrangement pattern stored in the memory unit, corresponding to the number of the operation keys, as well as based on one or more conditions of display stored in the memory unit, for only the operation key or keys, among the various operation keys, respectively set, by the setting unit, to be displayed on the operation/display unit.

9. The money handling apparatus according to claim 1,
wherein the same operation/display unit is commonly used for a plurality of money handling apparatuses of different types,
the memory unit stores therein information, for each operation key, on whether or not this operation key is to be used in each of the plurality of money handling apparatuses of the different types, and
the control unit calculates the display-position information on each operation key, based on one or more conditions of display stored in the memory unit, for only the operation key or keys, among the various operation keys, respectively stored, in the memory unit, to be used corresponding to the type of each money handling apparatus, as well as set, by the setting unit, to be displayed on the operation/display unit.

10. The money handling apparatus according to claim 1, wherein the contents of display of each operation key is an icon, and the display-position information on each operation key is a coordinate of each of start and end points of each corresponding icon displayed on the operation/display unit.

11. The money handling apparatus according to claim 1, wherein the operation/display unit is composed of a touch panel.

12. A money handling method using the money handling apparatus according to claim 1, the method comprising:
storing the existence or nonexistence of display, contents of display, display-position information and one or more conditions of display, for the various operation keys, in advance, respectively in the memory unit;
changing the existence or nonexistence of display of each operation key, for the operation key or keys to be displayed on the operation/display unit;
calculating the display-position information on each operation key, based on one or more conditions of display stored in the memory unit, for only the operation key or keys set to be displayed, among the various operation keys; and
displaying the count result on the money counted by the money handling apparatus, on the operation/display unit, as well as displaying each operation key set to be displayed, on the operation/display unit, in the display position and size based on the display-position information on each operation key,
wherein when a certain operation key displayed on the operation/display unit is pushed, the instruction corresponding to this operation key is sent to the control unit of the money handling apparatus.

* * * * *